Patented Feb. 3, 1942

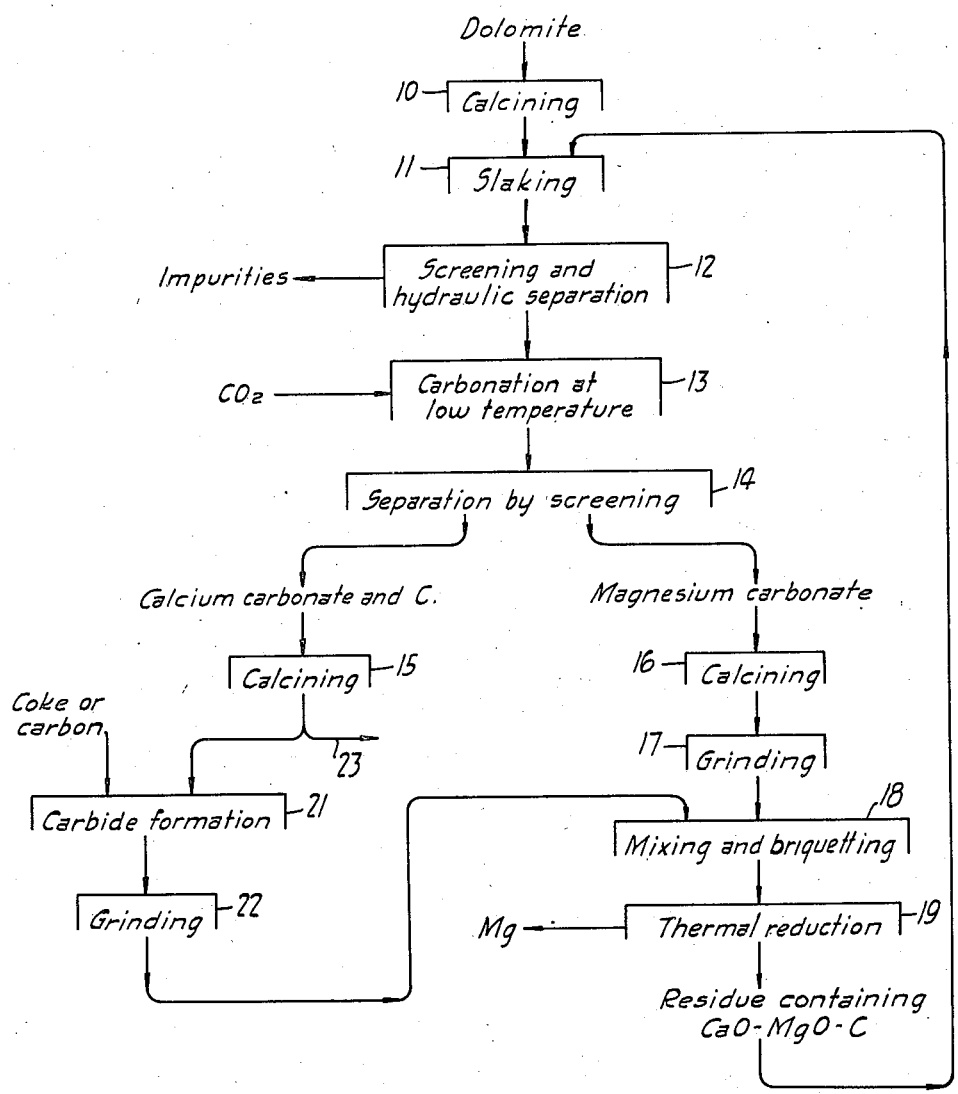
FIG_1_

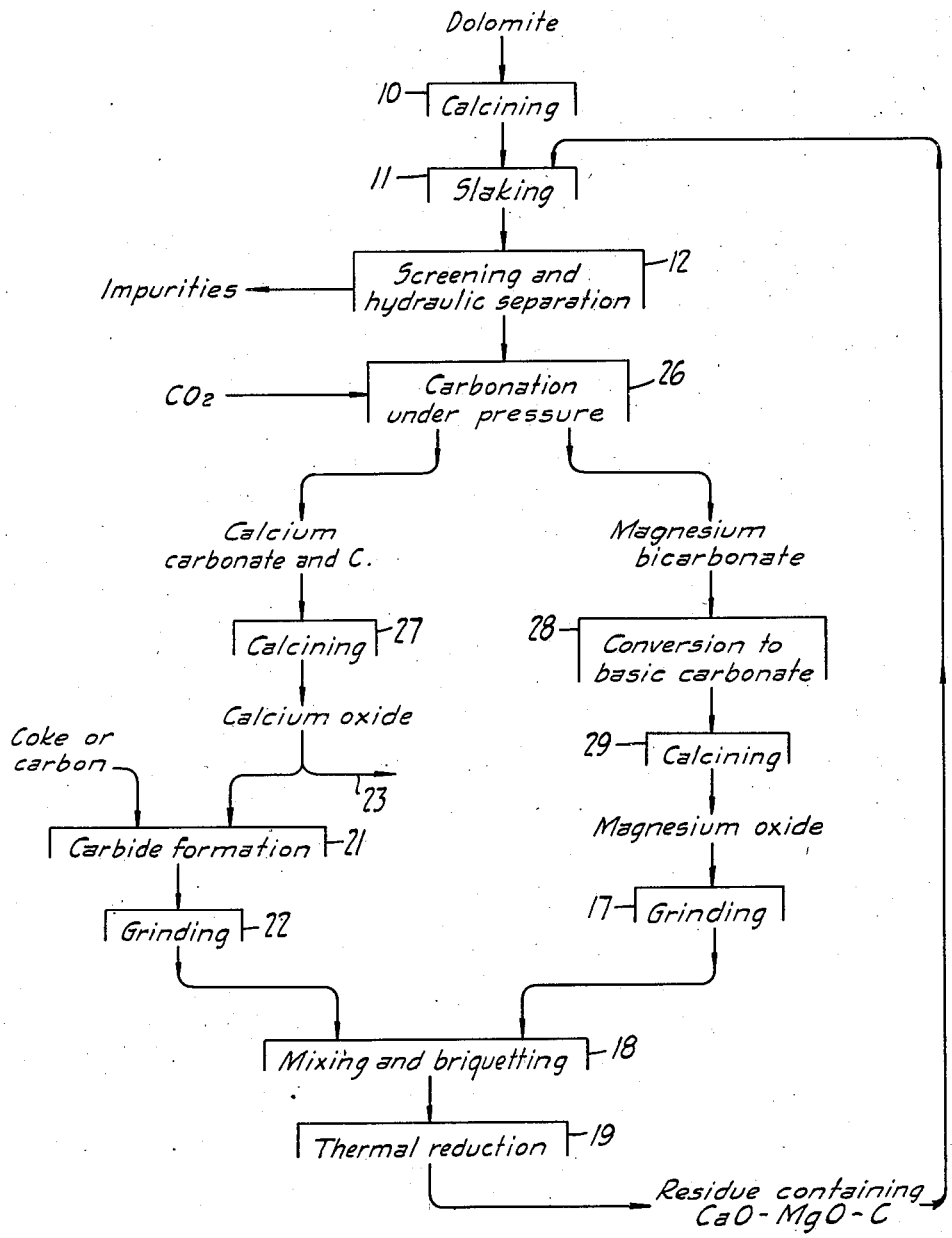
FIG_2_

2,271,626

UNITED STATES PATENT OFFICE 2,271,626

METHOD OF MANUFACTURING METALLIC MAGNESIUM

Neil R. Collins, Los Altos, and Gunter H. Gloss, Belmont, Calif., assignors to Marine Magnesium Products Corporation, South San Francisco, Calif., a corporation of Delaware Application March 28, 1941, Serial No. 385,654

6 Claims. (Cl. 75—67)

This invention relates generally to processes for the manufacture of metallic magnesium by thermal reduction. More particularly, the invention relates to processes for the manufacture of metallic magnesium from dolomitic materials.

In the past, the chief sources of material for the manufacture of metallic magnesium by the thermal reduction process has been magnesite. In many localities, dolomite is available as a cheap source of magnesium carbonate, but this is combined in varying proportions with calcium carbonate. The presence of calcium interferes with direct use of such material in certain reducing operations. For example, it has been proposed to reduce calcined dolomite with calcium carbide, but such a process does not give an efficient reducing reaction because of the diluting effect of the calcium oxide present.

It is an object of the present invention to provide a process making possible the economical use of dolomite in the manufacture of metallic magnesium by the thermic reduction process.

It is a further object of the invention to provide a process making possible utilization of the residue after the reducing operation, but which will not cause a building up of impurities in the process.

Further objects of the invention will appear from the following description in which the preferred embodiments have been set forth in detail in conjunction with the accompanying drawings.

Referring to the drawings:

Figure 1 is a flow sheet illustrating a process incorporating the present invention; and Figure 2 is a flow sheet illustrating another embodiment of the invention.

In general, the present process involves calcining a suitable dolomite or dolomitic material, after which the calcined material is subjected to certain separating operations to yield calcium and magnesium oxides. The magnesium oxide is subjected to thermal reduction with calcium carbide to yield metallic magnesium and a residue containing calcium oxide, carbon, and varying amounts of unreacted calcium carbide and magnesium oxide. This residue is returned to the process whereby the same separating operation which operates upon the calcined dolomite also operates upon the residue. At least a part of the calcium oxide yielded from the separating operation is utilized for the manufacture of calcium carbide which is then used in the process for the thermal reduction of magnesium oxide.

Referring to the embodiment of the invention as illustrated in Figure 1, a suitable dolomite, such as one having a 1 to 1 molecular ratio between the calcium and magnesium content, is subjected to the calcining operation 10 at a suitable temperature such as 900 to 1150° C. to produce a mixture of calcium and magnesium oxides. This calcined material is then subjected to slaking 11 at a suitable temperature, such as from 90 to 100° C., and the resulting slurry is subjected to screening and hydraulic separation 12 for the removal of oversize and heavier impurities. The impurities may include silica from the original dolomite, silicates, oversize material improperly calcined, and, as will be presently explained, impurities such as calcium silicate from the returned residue of the thermal reduction operation.

The purified slurry from operation 12 is then subjected to separating treatment for the purpose of yielding separate calcium and magnesium oxide. In Figure 1, this separating treatment is carried out by carbonation, at low temperatures, followed by screening out solid phase magnesium carbonate from calcium carbonate. Thus, the screened material from separation 12 is shown being supplied to the operation 13, where the slurry is subjected to carbonation at relatively low temperatures. I have reference to temperatures of the order of 16 to 18° C. with contact of the slurry with carbon dioxide. It is desirable to provide the carbon dioxide in a gas such as air or flue gas which is relatively weak in carbon dioxide content. For example, if a flue gas is employed, it may contain about 10% by volume of carbon dioxide. Carbonation under such conditions produces a mixture of solid phase calcium and magnesium carbonates, with the magnesium carbonate crystals being substantially larger than the crystals of calcium carbonate. This solid phase material is then subjected to screening operation 14, for the separate recovery of calcium and magnesium carbonates. These separate carbonates are then shown being supplied to the separate calcining operations 15 and 16 to produce calcium and magnesium oxides.

The magnesium oxide is subjected to grinding at 17, and it is then intermixed with calcium carbide and the mixture made into suitable briquets as at 18 for supplying to the thermal reduction operation 19. Thermal reduction is carried out at a suitable temperature, such as from 1050 to 1115° C., under a relatively high vacuum, such as 0.2 to 10 millimeters of mercury. When graphite or Carborundum retorts or crucibles are employed, one may use higher temperatures and pressures, as is understood in the art.

The equipment for the thermal reduction operation need not be described in detail. Briefly, one can utilize a closed retort which is heated by a suitable furnace, and which has provision for receiving and condensing evolved magnesium vapor.

The residue from the thermal reduction operation 19 has been indicated as containing calcium oxide, carbon and varying amounts of unreacted calcium carbide and magnesium oxide. For the utilization of this residue, it is shown being returned to the slaking operation 11. Slaking converts any remaining calcium carbide to calcium hydroxide and acetylene. All of the calcium and magnesium hydroxide from this residue passes with the slaked dolomite entering the process, to the separating operation 12, and from thence to the carbonating operation 13. Impurities present in the residue, particularly calcium silicate, are removed to a substantial degree in the separating operation 12, together with some impurities in the original dolomite entering the process. The carbon from the residue passes out with the separated calcium carbonate from the separating operation 14. This carbon content is utilized to advantage in the calcining operation 15, because it is burned to supply heat.

The amount of calcium oxide made available from the process described above includes calcium oxide yielded from the dolomite entering the process, and also calcium oxide recovered from the residue of the thermal reduction operation 19. A part of this calcium oxide is then utilized as indicated for the manufacture of calcium carbide in step 21. Procedures for the manufacture of calcium carbide are well known to those skilled in the art. Briefly, carbide is manufactured in a suitable electrical furnace which is charged with calcium oxide and coke or carbon. Calcium carbide so produced is shown being subjected to grinding 22 before being supplied to the mixing and briquetting operation 18.

A part of the calcium oxide which is not required for manufacture of calcium carbide is shown being removed from the process at 23. This is a saleable by-product of the process.

In the process of Figure 2, more conventional carbonation under pressure is employed to yield separate calcium and magnesium oxides from the calcined dolomite. Thus, in this instance the purified slurry from operation 12 is supplied to the carbonating operation 26 where it is carbonated under pressure with carbon dioxide, to produce solid phase calcium carbonate, and magnesium bicarbonate in solution. The calcium carbonate is shown being subjected to calcining 27, and a part of the calcium oxide is shown being employed for the manufacture of calcium carbide.

The magnesium bicarbonate solution, which is removed from the calcium carbonate by suitable means such as decantation or filtration, is shown being converted to basic carbonate in operation 28, which is to be carried out by heating the solution to an elevated temperature at atmospheric pressure, thus converting the bicarbonate to basic carbonate. The basic carbonate is then shown being calcined at 29 to produce the magnesium oxide for grinding at 17. The residue from the thermal reduction operation 19 is shown being returned to the slaking operation 11, as in Figure 1. Here, again, the residue consisting of calcium oxide, carbon, and varying amounts of magnesium oxide and calcium carbide is utilized back in the process. Any residual calcium carbide is immediately reacted with water in a slaking operation to produce calcium hydroxide and acetylene. The calcium and magnesium contents of the residue pass with the calcium and magnesium content of the dolomite entering the process. The carbon of the residue passes with the calcium content, and appears with the calcium carbonate as indicated. This carbon content is utilized to advantage in the calcining operation 27, in that it is burned to supply heat.

Both of the embodiments described above afford practical processes making use of dolomite for the manufacture of metallic magnesium. The wasting of the residue from the thermal reduction operation is avoided, and a relatively pure calcium compound is produced as a valuable by-product.

We claim:

1. In a process for the manufacture of metallic magnesium from dolomitic materials containing calcium and magnesium, the steps of calcining the material, slaking the calcined material, effecting a separation between calcium and magnesium contents to yield calcium and magnesium oxides, utilizing the calcium oxide for the manufacture of calcium carbide, subjecting the magnesium oxide to thermal reduction with the calcium carbide to yield metallic magnesium and a residue containing calcium oxide, and returning said residue to the process.

2. In a process for the manufacture of metallic magnesium from dolomitic materials containing calcium and magnesium, the steps of calcining the material, slaking the calcined material, effecting a separation between calcium and magnesium contents to yield calcium and magesium oxides, utilizing the calcium oxide for the manufacture of calcium carbide, subjecting the magnesium oxide to thermal reduction with the calcium carbide to yield metallic magnesium and a residue containing calcium oxide, and utilizing the calcium oxide of the residue in the formation of additional calcium carbide for use in the process.

3. In a process for the manufacture of metallic magnesium from dolomitic materials having a calcium and magnesium content, the steps of calcining the material, slaking the calcined material, effecting a separation between calcium and magnesium contents to yield calcium and magnesium oxides, subjecting the magnesium oxide to thermal reduction with calcium carbide to yield metallic magnesium and a residue containing calcium oxide, magnesium oxide, and carbon, returning said residue to the process at a point ahead of said separating operation, and utilizing a part of the calcium oxide from the separating operation for the manufacture of calcium carbide for use in the process.

4. In a process for the manufacture of metallic magnesium from dolomitic materials having a calcium and magnesium content, the steps of calcining the material, slaking the calcined material, effecting a separation in water between calcium and magnesium contents to yield calcium and magnesium oxides, subjecting the magnesium oxide to thermal reduction with calcium carbide to yield metallic magnesium and a residue containing calcium oxide, magnesium oxide, and carbon, reintroducing the residue into the process at a point ahead of said separating operation, removing impurities from the process to prevent a build-up of the same, and utilizing a part of the calcium oxide for preparation of calcium carbide for use in the process.

5. In a process for the manufacture of metallic magnesium from dolomitic materials having a calcium and magnesium content, the steps of calcining the material, slaking the calcined material, removing impurities from the slaked material, effecting a separation between the calcium and magnesium contents of the material to yield calcium and magnesium oxides, subjecting the magnesium oxide to thermal reduction with calcium carbide to yield metallic magnesium and a residue containing calcium oxide, magnesium oxide, and carbon, returning the residue to the process at a point ahead of said removal of impurities, and utilizing a part of said calcium oxide for the production of calcium carbide for use in the process.

6. In a process for the manufacture of metallic magnesium from dolomitic materials having a calcium and magnesium content, the steps of calcining the material, slaking the calcined material, effecting a separation between calcium and magnesium contents to yield calcium and magnesium carbonates, calcining the magnesium carbonate to form magnesium oxide, subjecting the magnesium oxide to thermal reduction with calcium carbide to yield metallic magnesium and a residue containing calcium oxide, magnesium oxide and carbon, returning said residue to the process at a point ahead of said separating operation, whereby the calcium content of said residue together with the carbon content is separated out as a part of the calcium carbonate together with carbon, and whereby the magnesium content of the residue is separated out together with the magnesium carbonate of the original material, calcining the calcium carbonate with burning of its carbon content to produce calcium oxide, and utilizing a portion of said calcium oxide to manufacture calcium carbide for use in the process.

NEIL R. COLLINS.
GUNTER H. GLOSS.